Patented Nov. 2, 1943

2,333,577

UNITED STATES PATENT OFFICE 2,333,577

PLASTIC COMPOSITION

William W. Koch, Wilmington, Del., assignor to Hercules Powder Company, Wilmington, Del., a corporation of Delaware No Drawing. Application April 27, 1942, Serial No. 440,695

10 Claims. (Cl. 106—179)

This invention relates to the stabilization of ethyl cellulose and more particularly to the production of ethyl cellulose compositions which retain their viscosity, flexibility, and color after exposure to heat, ultraviolet light, or outdoor weathering.

Ethyl cellulose compositions have been used in a variety of applications such as films, foils, sheets, coating compounds, fabrics, filaments, and in numerous molded articles such as combs, buttons, tableware, brushes, radio parts, etc., where the compositions of ethyl cellulose have been subjected to injection and compression molding operations and extrusion.

In the formation of injection molding compositions, it is vitally important that the compositions should not be degraded by the heat to which they are subjected during the compounding and molding cycles. Such degradation results in a lowered flexibility, brittleness, loss of impact strength, and a marked lowering of the viscosity of the ethyl cellulose. It is also important that the ethyl cellulose compositions should not develop undesirable coloring during the molding operations. The degradation apparently is a breakdown of the molecule into smaller molecules, hence the brittleness, lowered viscosity, etc.

Ethyl cellulose has been made up into thin sheets for use as a wrapping material, adhesive tape, etc., and into heavier sheets which have been used for flexible windows, paneling, etc. Resistance to the degrading effects of heat, ultraviolet light, or outdoor weathering for these sheets is very important and here again it is desirable to avoid development of undesirable color during exposure. The prevention of the degradation of ethyl cellulose by heat, ultraviolet light, and outdoor weathering is also of vital importance in the successful exploitation of the compound in lacquers, varnishes, and other plastic coating compositions.

One method of stabilizing the color of ethyl cellulose to heat has been extraction with acidulated aqueous alcohol followed by washing treatments. However, such extracted or purified ethyl cellulose, although having good color stability, usually exhibits poor viscosity stability upon heating.

Now, in accordance with the present invention, the heat, ultraviolet light, and outdoor weathering stability of ethyl cellulose and various plastic compositions made therefrom have been accomplished by the addition of a small amount of one or more of the phenols with a carbon linkage para substituent and an oxygen linkage ortho substituent.

These phenols may be represented by the general formula:

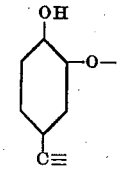

There may be other substituents on the ring but the above substituents are basic. Examples of the type compound found suitable are: Eugenol, vanillin, vanillyl alcohol, syringic acid, gallic acid, para tertiary butyl catechol, benzyl catechol, hexyl catechol protocatechuic acid, esters of syringic, gallic, protocatechuic acids, etc.

In general, the compounds with a methoxyl group in the ortho position are preferable because of increased color stability. Syringic acid has been found particularly suitable and has the formula:

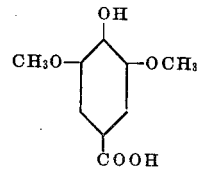

These stabilizers are effective in very small proportions. It is not proposed, nor is it necessary, to use these stabilizing reagents in amounts above about 3% of the weight of the ethyl cellulose present. Preferably, they will be employed in amounts equivalent to 1% of the ethyl cellulose. Larger amounts than 3% are not necessary. Amounts substantially less than 0.5% do not have the desirable stabilizing effect.

The stability to heat, ultraviolet light, and outdoor weathering are measured by the percentage retention of viscosity, flexibility, and color. In many cases, the percentage viscosity retention is substantially equivalent to flexibility because lower flexibility tending toward brittleness indicates a lower viscosity.

The percentage viscosity retention is measured by the following method: Two duplicate samples of ethyl cellulose film are carefully dried out. One sample is made up into a 5% solution with 80–20 toluene-alcohol and the viscosity measured. The other sample is kept for 48 hours at a temperature of 120° C. then made up into a solution and tested like the first sample and the viscosity is compared.

The following tables illustrate the beneficial effect of these stabilizers upon the retention of viscosity and the retention of flexibility of films of ethyl cellulose having an ethoxyl content within the range of 44.5% and 49.0% ethoxyl when subjected to heat, ultraviolet light and outdoor weathering.

TABLE I

Effect of ultraviolet light (50 hour exposure)

| Stabilizer | Viscosity retention | Color |
| --- | --- | --- |
| | Per cent | |
| Blank | 11 | Slight discoloration. |
| 1% eugenol | 25 | No discoloration. |
| 1% syringic acid | 61 | Do. |
| 1% p-tertiary butyl catechol | 58 | Slight discoloration. |
| 1% vanillyl alcohol | 42 | No discoloration. |
| 1% gallic acid | 90 | Discolored. |
| 1% vanillin | 25 | Slight discoloration. |
| 1% benzyl catechol | 95 | Do. |
| 1% hexyl catechol | 78 | Do. |

TABLE II

Effect of heat (120° C. for 48 hours)

| Stabilizer | Viscosity retention | Color |
| --- | --- | --- |
| | Per cent | |
| Blank | 12 | Moderate discoloration. |
| 1% eugenol | 25 | Do. |
| 1% syringic acid | 108 | Very slight discoloration. |
| 1% p-tertiary butyl catechol | 74 | Discolored. |
| 1% vanillyl alcohol | 52 | Very slight discoloration. |
| 1% gallic acid | 116 | Discolored. |
| 1% vanillin | 93 | Slight discoloration. |
| 1% benzyl catechol | 90 | Very slight discoloration. |
| 1% hexyl catechol | 92 | Do. |

TABLE III

Effect of outdoor weathering (117 days)

| Stabilizer | Flexibility | Color |
| --- | --- | --- |
| Blank | Extremely brittle. | Slight discoloration. |
| 1% eugenol | Brittle. | No discoloration. |
| 1% syringic acid | Flexible. | Slight discoloration. |
| 1% p-tertiary butyl catechol. | Slightly brittle. | Discolored. |
| 1% vanillyl alcohol | do | No discoloration. |
| 1% gallic acid | Flexible. | Discolored. |
| 1% vanillin | Slightly brittle. | Slight discoloration. |

The ethoxyl content and the viscosity of the ethyl cellulose may vary within the ranges commercially available although the types having an ethoxyl content between 44.5 and 49.0% are generally used for most purposes. For molded articles, a viscosity of about 100 centipoises is usually used and films are usually made up of 50 centipoise viscosity grades. Lower viscosity types are usually used in lacquers, varnishes, etc., principally material of 22 centipoises or less.

Plasticizers for ethyl cellulose such as tributylphosphate, tricresylphosphate, triphenylphosphate, dimethyl phthalate, diethyl phthalate, dibutyl phthalate, diamyl phthalate, diphenyl phthalate, vegetable oil fatty acids, such as castor oil fatty acids, fatty alcohol such as lauryl alcohol, vegetable oils such as linseed oil, etc., may be incorporated in amounts necessary to the particular use to which the plastic is to be put. In addition, there may be mixed with ethyl cellulose various compatible resins such as wood rosin, run congo, dammar, cumar, etc., as well as fillers, pigments, and coloring matter. The stabilizers are added to the composition during the compounding of the lacquers or plastics and become thoroughly dispersed during the mixing operations. While the addition of the compound during the mixing operation would seem to be the most practical method, other methods are within the contemplation of this invention.

Thus, according to the present invention, phenols with a carbon linkage para substituent and an oxygen linkage ortho substituent have been found to be very effective heat, ultraviolet light, and outdoor weathering stabilizers. The stability is attained either with or without other ingredients being present, and the retention of viscosity, flexibility, and color was found to be excellent.

What I claim and desire to protect by Letters Patent is:

1. A plastic composition comprising ethyl cellulose and a phenol having a carbon linkage para substituent and an oxygen linkage ortho substituent as a stabilizer therefor.

2. A plastic composition comprising ethyl cellulose and from about 0.5% to about 3% of a phenol having a carbon linkage para substituent and an oxygen linkage ortho substituent as a stabilizer therefor.

3. A plastic composition comprising ethyl cellulose and syringic acid as a stabilizer therefor.

4. A plastic composition comprising ethyl cellulose and vanillyl alcohol as a stabilizer therefor.

5. A plastic composition comprising ethyl cellulose and para tertiary butyl catechol as a stabilizer therefor.

6. A plastic composition comprising ethyl cellulose and about 1% by weight of a phenol having a carbon linkage para substituent and an oxygen linkage ortho substituent as a stabilizer therefor.

7. A plastic composition comprising ethyl cellulose, a plasticizer, and a phenol having a carbon linkage para substituent and an oxygen linkage ortho substituent as a stabilizer therefor.

8. A plastic composition comprising ethyl cellulose and about 1% by weight of syringic acid as a stabilizer therefor.

9. A plastic composition comprising ethyl cellulose and about 1% by weight of vanillyl alcohol as a stabilizer therefor.

10. A plastic composition comprising ethyl cellulose and about 1% by weight of para tertiary butyl catechol as a stabilizer therefor.

WILLIAM W. KOCH.